Patented Aug. 26, 1952

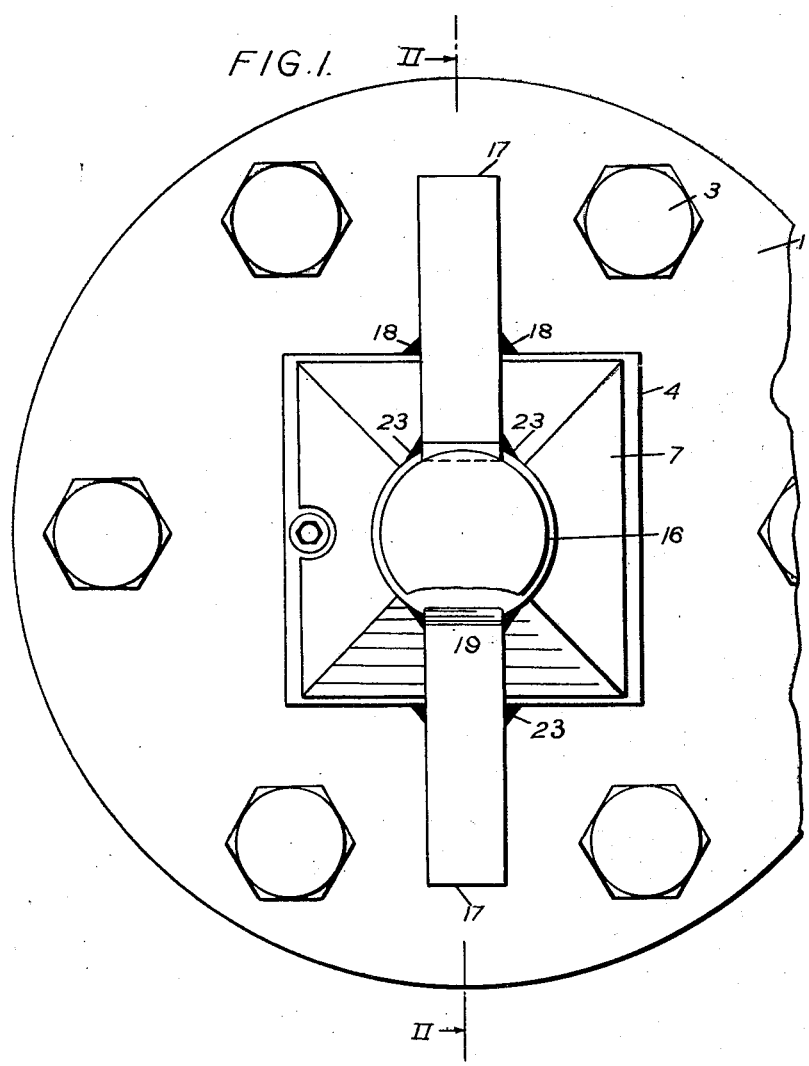

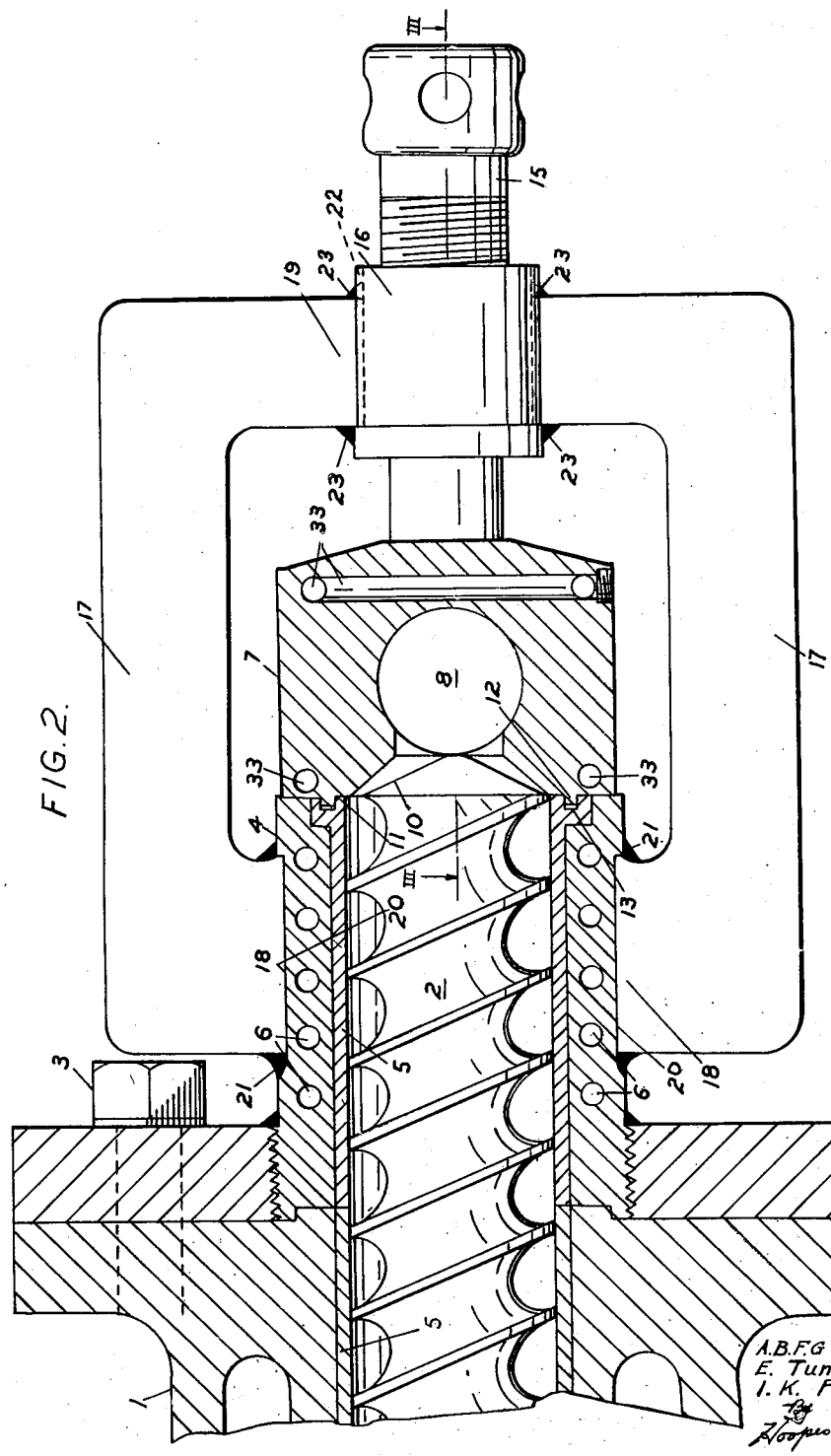

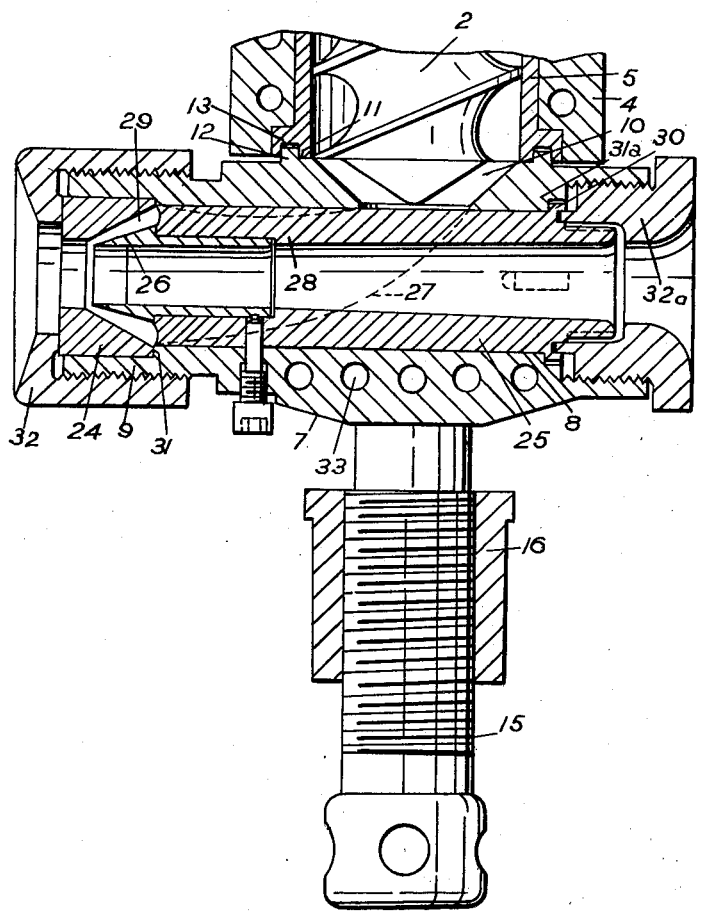

2,607,953

UNITED STATES PATENT OFFICE 2,607,953

EXTRUSION APPARATUS

Arthur Bruce Fraser Gillespie Richardson, Eustace Tunnicliff, and Ivan Kenneth Fisher, Leigh, England, assignors to British Insulated Callender's Cables Limited, London, England, a British company Application February 28, 1950, Serial No. 146,861
In Great Britain March 23, 1949

5 Claims. (Cl. 18—13)

This invention relates to machines for the extrusion of extrudable masses, such as rubber mixes and synthetic thermoplastics (all hereinafter for convenience referred to as "rubber"), about a core to form a covering or sheath for the core. Such machines comprise a cylinder, generally called a barrel, in which works a piston or, as is more usual, a rotatably driven feed screw, for propelling rubber fed into one end of the barrel along the barrel and thence into an extrusion head at the other end of the barrel. From this head the rubber is expelled through a die to form a covering on the core as the core is caused to travel forward through the die aperture. The core is led through the head to the die through a core tube which serves to centralize or otherwise position the core in the die aperture.

In particular the invention is concerned with such extrusion machines of the kind in which the head is of small capacity and detachably secured to the barrel with the axis of the head lying transverse, generally at right angles, to the axis of the barrel. Such a head has the advantage that the rubber passes rapidly through it so that risk of premature vulcanisation is reduced. It also has the advantage that the time lost in production due to the necessity of cleaning the head or of changing the dies can be reduced to the time required to detach the head and replace it by a clean head in which dies of the appropriate size have already been inserted. The original head can then be cleaned at leisure whilst production continues.

By the present invention we provide a rubber extrusion machine having a detachable, small capacity head which is secured to the barrel in a particularly easily releasable manner and has other advantages to which reference will be made later.

In accordance with our invention the head of our improved machine is clamped to the barrel, with a lateral opening in its wall, which leads to the interior of the head, in register with the delivery opening at the front end of the barrel, by a clamping device consisting of a strap and a clamping screw. The strap passes round the head with a clearance and is anchored at its ends to the barrel. The clamping screw works in a screw-threaded hole in the strap co-axial with the barrel and bears upon a face of the head opposite the lateral opening. The head is released from the barrel by running back the clamping screw whereupon, unless it is restrained by attachment to other apparatus, the head can be moved away from the barrel to break the joint and then slid endwise through the embracing strap.

In applying the invention to existing machines we prefer to replace the normal extrusion head detachably secured to the front end of the barrel by a tubular member which forms an extension of the barrel and to clamp the head to the front end face of this tubular member by means of a clamping screw working in a strap whose ends are secured, preferably in a permanent manner, to the wall of the tubular member that is bolted or otherwise detachably secured on the end of the barrel. The feed screw preferably projects into the bore of such tubular member which then, to all intents and purposes, forms a part of the working cylinder or barrel of the extrusion machine. This construction may also be used with advantage when building new machines, for it renders the barrel and screw more accessible for cleaning purposes than a mere removal of the strap could do.

To enable the invention to be more fully understood and readily put into practice, an example of a rubber covering machine embodying the invention will now be described with the help of the accompanying drawings wherein, Figure 1 is an end elevation of the head and its clamping device, Figure 2 is a section, taken on the line II—II of Figure 1, showing the delivery end of the barrel and a small capacity head clamped thereto, and Figure 3 is a section taken on the line III—III of Figure 2, showing a core tube and a matrix mounted in the head.

On referring to the drawings, it will be seen that to the front end of the barrel 1 housing the feed screw 2 is secured by stud bolts 3 a flanged tubular member 4 having a cylindrical bore which is co-axial with the barrel. This tubular member and the barrel are fitted with renewable liners 5 which together form the cylinder in which the feed screw 2 works. Except for its flanged portions, the member 4 is externally of square section, its walls having passages 6 for the circulation of heat-exchanging fluid.

The extrusion head comprises a substantially rectangular block 7 having a through bore 8 extending from one face to and through a cylindrical projection 9 on the opposite face. In the wall between this bore and a third face of the block is a lateral opening 10 of conical form and converging towards the bore 8. Around the opening 10 is a joint face 11 and around and upstanding from the face 11 is an annular wall 12 of which the internal surface fits the internal wall of a correspondingly shaped recess 13 in the front end face 14 of the member 4 and accurately registers the lateral opening with the working cylinder. The wall 12 and recess 13 are of circular form and concentric with the barrel axis. This permits the axis of the through bore (which is the extrusion axis) to be adjusted to any desired angle to the horizontal.

The block 7 is held in place by a single clamping screw 15 which works in an internally screw threaded sleeve 16 held in axial alignment with the barrel by a pair of bars 17 of rectangular cross section, each formed with a short foot 18 at one end and a longer foot 19 at the other. The feet 18 enter recesses 20 in the top and bottom faces of the member 4 and are secured by welding as shown at 21. The feet 19 enter recesses 22 on diametrically opposite sides of the external surface of the sleeve 16 and are similarly secured as shown at 23. The sleeve and the two bars thus form a strap which passes round the block 7 with a clearance and is anchored at its ends to the barrel.

As will be seen from Figure 3, the through bore in the block houses a matrix 24 and a core tube 25 which respectively form the front and rear end walls of the interior of the head. The matrix is held against the step 31 by a retaining nut 32. The core tube carries an inner die or point 26 and, between the lateral opening in the block and its front end, is of reduced cross-section to provide between it and the wall of the bore 8 two passages 27 of segmental cross-section, one on each side of a longitudinally apertured web 28, which lead the stock from the lateral opening 10 to a forming chamber 29 between the die and the matrix, gradually changing its direction of flow as the front ends of the passages are approached. The rear end of this core tube 25 carries a peripheral flange 30 which is held against the step 31a by a retaining nut 32a which screws into the internally threaded rear end of the bore 8. Passages 33 are provided in the block for the circulation of fluid to maintain the head at a temperature suitable for the material being extruded. The particular construction of head shown in Figure 3 is more fully described and claimed in the complete specification of our co-pending application No. 146,862, filed July 17, 1951, which has become Patent 2,560,778.

It will be apparent from the drawings that the head is released simply by running back the clamping screw 15 to an extent greater than the height of the annular wall 12. In cases where the head is restrained by attachment to other apparatus as where it is necessary for the extruded product to pass directly from the matrix into a chamber, for instance, a vulcanising chamber or a cooling tank, which has to be coupled to the delivery end of the head, it will be apparent that if the advantages of rapid detachability of the head from the barrel are not to be lost, some form of rapidly releasable coupling between the head and such a chamber or tank is necessary. Such forms of coupling, which are known, form no part of the present invention. In cases where it is necessary to place the core tube under vacuum and to provide a vacuum seal or gland through which the core is fed into the core tube, it may be advantageous to provide a rapidly releasable coupling between the entry end of the head and such gland member.

What we claim as our invention is:

1. An extrusion machine comprising a barrel having a delivery opening at its front end, means for impelling extrudable material from said barrel through said delivery opening, an extrusion head on the front end of said barrel having its axis transverse to the axis of said barrel and having a lateral opening leading to the interior of said head, a strap passing round said head with a clearance and anchored at its ends to said barrel, a clamping screw in screw threaded engagement with said strap and in axial alignment with said barrel for bearing upon a face of said head opposite the lateral opening, whereby to clamp said head to said barrel, and means for maintaining the lateral opening in said head in register with the delivery opening of said barrel. said registering means being concentric with said lateral opening whereby to permit angular adjustment of said head about the axis of said barrel.

2. An extrusion machine comprising a barrel having a delivery opening at its front end, means for impelling extrudable material from said barrel through said delivery opening, a tubular member detachably secured to the front end of said barrel and forming an extension of said barrel, an extrusion head on the front end of said tubular member having its axis transverse to the axis of said tubular member and having a lateral opening leading to the interior of said head, means for maintaining the lateral opening in said head in register with the bore of said tubular member, said registering means being concentric with said lateral opening whereby to permit angular adjustment of said head about the axis of said barrel, a strap passing round said head with a clearance and anchored at its ends to said tubular member, and a clamping screw in screw threaded engagement with said strap and in axial alignment with said tubular member, for exerting pressure upon a face of said head opposite the lateral opening, whereby to clamp said head to the front end of said tubular member.

3. Means for mounting a detachable head on an extrusion machine with its axis transverse to the axis of the barrel of the machine and a lateral opening leading to the interior of the head in register with the delivery end of the barrel, comprising a tubular member adapted to be detachably secured to the front end of the barrel to form a barrel extension piece, an internally screw threaded sleeve for receiving a clamping screw, and means for holding said sleeve in axial alignment with and spaced from the adjacent end of said tubular member including a pair of bars, each having a foot at each end, the feet at one end of the pair being welded to diametrically opposite sides of the wall of the tubular member and the feet at the other end of the pair being welded to diametrically opposite sides of the wall of the screwed sleeve, said bars having a cross section of which the width measured in a direction parallel to the axis of the head is small compared with the length of the head and being well spaced from said head, whereby to allow said head to be angularly adjusted about the axis of said extrusion machine through a substantial angle.

4. An extrusion machine comprising a barrel having a delivery opening at its front end, means for impelling extrudable material from said barrel through said delivery opening, an extrusion head externally of polygonal cross section on the front end of said barrel having its axis transverse to the axis of said barrel and having a lateral opening leading to the interior of said head, a strap anchored at its ends to said barrel and passing round said head with a clearance between said strap and each of two diametrically opposite faces of said head of polygonal section permitting said head to be angularly adjusted about the axis of said barrel through a substantial angle, a clamping screw in screw-threaded engagement with said strap and in axial alignment with said barrel for bearing upon a face of said head opposite the lateral opening, whereby to clamp said head to said barrel, and registering means concentric with said lateral opening for maintaining the lateral opening in said head in register with the delivery opening of said barrel throughout the permitted range of angular adjustment of said head about the axis of said barrel.

5. An extrusion machine comprising a barrel having a delivery opening at its front end, means for impelling extrudable material from said barrel through said delivery opening, a tubular member detachably secured to the front end of said barrel and forming an extension of said barrel, an extrusion head externally of polygonal cross section on the front end of said tubular member having its axis transverse to the axis of said tubular member and having a lateral opening leading to the interior of said head, a strap anchored at its ends to said tubular member and passing round said head with a clearance between said strap and each of two diametrically opposite faces of said head of polygonal section permitting said head to be angularly adjusted about the axis of said barrel through a substantial angle, a clamping screw in screw-threaded engagement with said strap and in axial alignment with said barrel for bearing upon a face of said head opposite the lateral opening, whereby to clamp said head to the front end of said tubular member, and registering means concentric with said lateral opening for maintaining the lateral opening in said head in register with the bore of said tubular member throughout the permitted range of angular adjustment of said head about the axis of said barrel.

ARTHUR BRUCE FRASER.
GILLESPIE RICHARDSON.
EUSTACE TUNNICLIFF.
IVAN KENNETH FISHER.

REFERENCES CITED

The following references are of record in the file of this patent:

UNITED STATES PATENTS

| Number | Name | Date |
| --- | --- | --- |
| 2,035,247 | Royle | Mar. 24, 1936 |
| 2,453,312 | Frazier | Nov. 9, 1948 |